(12) United States Patent
Lee

(10) Patent No.: US 11,493,096 B2
(45) Date of Patent: Nov. 8, 2022

(54) AXLE DISCONNECT ASSEMBLY

(71) Applicant: Schaeffler Technologies AG & Co. KG, Herzogenaurach (DE)

(72) Inventor: Brian Lee, York, SC (US)

(73) Assignee: SCHAEFFER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/204,383

(22) Filed: Mar. 17, 2021

(65) Prior Publication Data

US 2022/0154778 A1  May 19, 2022

Related U.S. Application Data

(60) Provisional application No. 63/113,732, filed on Nov. 13, 2020.

(51) Int. Cl.
*F16H 63/32* (2006.01)
*F16H 63/20* (2006.01)
(Continued)

(52) U.S. Cl.
CPC .............. *F16D 11/10* (2013.01); *B60K 17/02* (2013.01); *F16D 23/14* (2013.01);
(Continued)

(58) Field of Classification Search
CPC .............. F16D 11/10; F16D 2011/002; F16D 2300/14; F16D 2127/02; F16D 2125/40;
(Continued)

(56) References Cited

U.S. PATENT DOCUMENTS

| 1,153,831 A * | 9/1915 | Slentz | F16D 43/26 192/33 R |
| 2008/0060461 A1* | 3/2008 | Hohn | F16H 63/32 74/331 |

(Continued)

FOREIGN PATENT DOCUMENTS

| CN | 103280344 A | * | 9/2013 | |
| CN | 209524078 U | * | 10/2019 | F16H 61/32 |

(Continued)

OTHER PUBLICATIONS

Machine language translation of EP2409873.*

*Primary Examiner* — Tisha D Lewis
(74) *Attorney, Agent, or Firm* — Volpe Koenig

(57) ABSTRACT

An axle disconnect assembly, including: a housing and a clutch a shaft with first splines; a sleeve including second splines non-rotatably connected to the first splines, and axially extending teeth; a shift lever including at least one pivot pin, a first end connected to the sleeve, and a second end; and an actuation assembly including an actuation shaft engaged with the second end of the shift lever, and an actuator. In a connect mode, the teeth are non-rotatably connected to a power output. In a disconnect mode, the sleeve is rotatable with respect to the power output. To shift from the disconnect mode to the connect mode: the actuator rotates the actuator shaft; the actuator shaft pivots the shift lever around an axis of the at least one pivot pin; and the first end of the shift lever displaces the sleeve, with respect to the shaft, in an axial direction.

20 Claims, 11 Drawing Sheets

(51) Int. Cl.
*F16H 61/32* (2006.01)
*F16D 11/10* (2006.01)
*F16D 23/14* (2006.01)
*B60K 17/02* (2006.01)
*F16D 125/40* (2012.01)
*F16D 127/02* (2012.01)
*F16D 23/12* (2006.01)
*F16D 11/00* (2006.01)

(52) U.S. Cl.
CPC .. *F16D 2011/002* (2013.01); *F16D 2023/123* (2013.01); *F16D 2023/141* (2013.01); *F16D 2125/40* (2013.01); *F16D 2127/02* (2013.01); *F16D 2300/14* (2013.01)

(58) Field of Classification Search
CPC ......... F16D 2023/141; F16D 2023/123; F16D 23/14; B60K 17/02; F16H 63/20; F16H 63/32; F16H 63/304; F16H 2063/321; F16H 2063/325; F16H 61/32
See application file for complete search history.

(56) References Cited

U.S. PATENT DOCUMENTS

| | | | | |
|---|---|---|---|---|
| 2010/0206649 | A1* | 8/2010 | Ishii | B60K 7/0007 180/65.31 |
| 2012/0018274 | A1* | 1/2012 | Prix | B60W 20/40 192/84.1 |
| 2014/0214294 | A1* | 7/2014 | Mori | F16D 11/10 701/60 |
| 2015/0343901 | A1* | 12/2015 | Brooks | F16D 28/00 180/245 |
| 2017/0146072 | A1* | 5/2017 | Siddaramappa | F16H 48/08 |

FOREIGN PATENT DOCUMENTS

| | | | | |
|---|---|---|---|---|
| EP | 2409873 | * | 1/2012 | |
| FR | 2878596 | A1 * | 6/2006 | ............. F16H 63/20 |

* cited by examiner

AXLE DISCONNECT ASSEMBLY

CROSS-REFERENCE TO RELATED APPLICATIONS

This application claims the benefit under 35 U.S.C. § 119(e) of U.S. Provisional Application No. 63/113,732 filed on Nov. 13, 2020, which application is incorporated herein by reference.

TECHNICAL FIELD

The present disclosure relates to an axle disconnect assembly, in particular for electric vehicle applications, with electro-mechanical actuation.

BACKGROUND

For an electric or hybrid vehicle, selective coupling and decoupling is needed between an electric motor and an axle powered by the electric motor.

SUMMARY

According to aspects illustrated herein, there is provided an axle disconnect assembly, including: a housing and a clutch. The clutch is enclosed at least partly by the housing and includes: a main shaft including a first plurality of splines; a sleeve arranged to receive rotational torque, and including a second plurality of splines non-rotatably connected to the first plurality of splines and a plurality of teeth extending in an axial direction, parallel to an axis of rotation of the clutch; a shift lever including at least one pivot pin connected to the housing, a first end connected to the sleeve, and a second end; and an actuation assembly including a first actuator shaft engaged with the second end of the shift lever, and an actuator. In a connect mode of the axle disconnect assembly, the plurality of teeth of the sleeve is arranged to non-rotatably connect to a power output. In a disconnect mode of the axle disconnect assembly, the sleeve is arranged to be rotatable with respect to the power output. To shift from the disconnect mode to the connect mode: the actuator is arranged to rotate the first actuator shaft in a first direction around an axis of rotation of the first actuator shaft; the first actuator shaft is arranged to pivot the shift lever in a first pivot direction around a central axis of the at least one pivot pin; and the first end of the shift lever is arranged to displace the sleeve, with respect to the main shaft, in a first axial direction, parallel to the axis of rotation of the clutch.

According to aspects illustrated herein, there is provided an axle disconnect assembly, including a housing and a clutch. The clutch is enclosed at least partly by the housing and includes: a main shaft including a first plurality of splines; a sleeve arranged to receive rotational torque and including a second plurality of splines non-rotatably connected to the first plurality of splines and a plurality of teeth extending in a first axial direction parallel to an axis of rotation of the clutch; a shift lever including at least one pivot pin connected to the housing, a first end connected to the sleeve, and a second end; and an actuation assembly including an actuator shaft engaged with the second end of the shift lever, a nut meshed with the actuator shaft, and an actuator. In a connect mode of the axle disconnect assembly, the plurality of teeth of the sleeve is arranged to non-rotatably connect to a power output. In a disconnect mode of the axle disconnect assembly, the sleeve is arranged to be rotatable with respect to the power output. To shift from the disconnect mode to the connect mode: the actuator is arranged to rotate the actuator shaft in a first direction around an axis of rotation of the actuator shaft; the actuator shaft is arranged to displace the nut in a first shift direction parallel to an axis of rotation of the actuation shaft; the nut is arranged to displace the second end of the shift lever in the first shift direction; the shift lever is arranged to pivot in a first pivot direction around a central axis of the at least one pivot pin; and the shift lever is arranged to displace the sleeve, with respect to the main shaft, in the first axial direction.

According to aspects illustrated herein, there is provided a method of operating an axle disconnect assembly including a housing and a clutch at least partly enclosed by housing, the clutch including a main shaft, a sleeve non-rotatably connected to the main shaft, a shift lever including at least one pivot pin connected to the housing, and an actuation assembly including an actuator, an actuator shaft, and a nut meshed with the actuator shaft. The method includes: rotating, with the actuator, the actuator shaft in a first direction around an axis of rotation of the actuator shaft; displacing, with the actuator shaft, the nut in a first shift direction parallel to the axis of rotation of the actuator shaft; displacing, with the nut, a first end of the shift lever at least partly in the first shift direction; pivoting, with the nut, the shift lever in a first pivot direction around a central axis of the at least one pivot pin; displacing a second end of the shift lever at least partly in a first axial direction parallel to an axis of rotation of the clutch; displacing, with the second end of the shift lever, the sleeve in the first axial direction; non-rotatably connecting a plurality of teeth of the sleeve with a power output; and transmitting torque from the power output to a shaft non-rotatably connected to the main shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
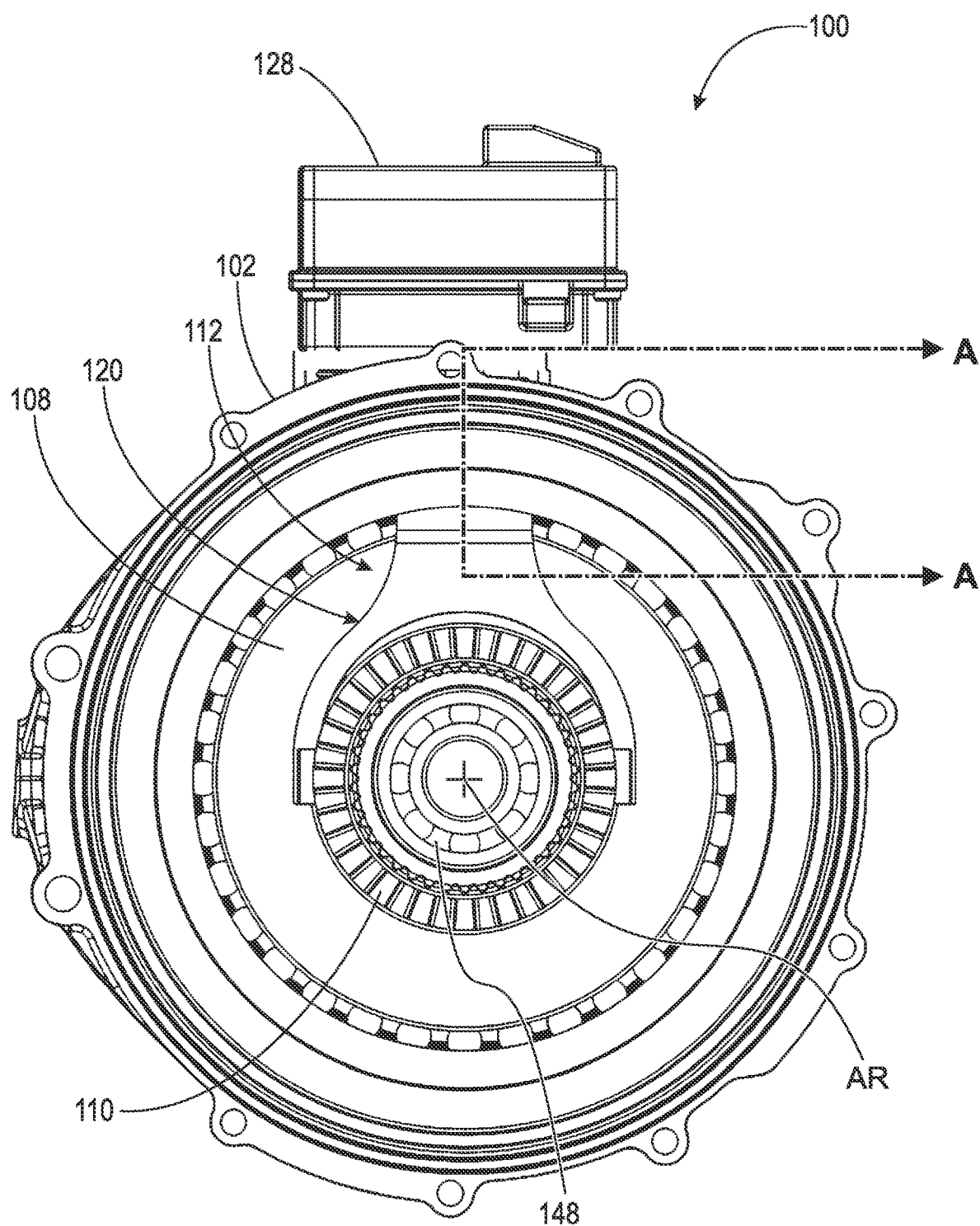
FIG. 1 is a front view of an example axle disconnect assembly.

FIG. 1 is a front view of example axle disconnect assembly 100.

Figure 2:
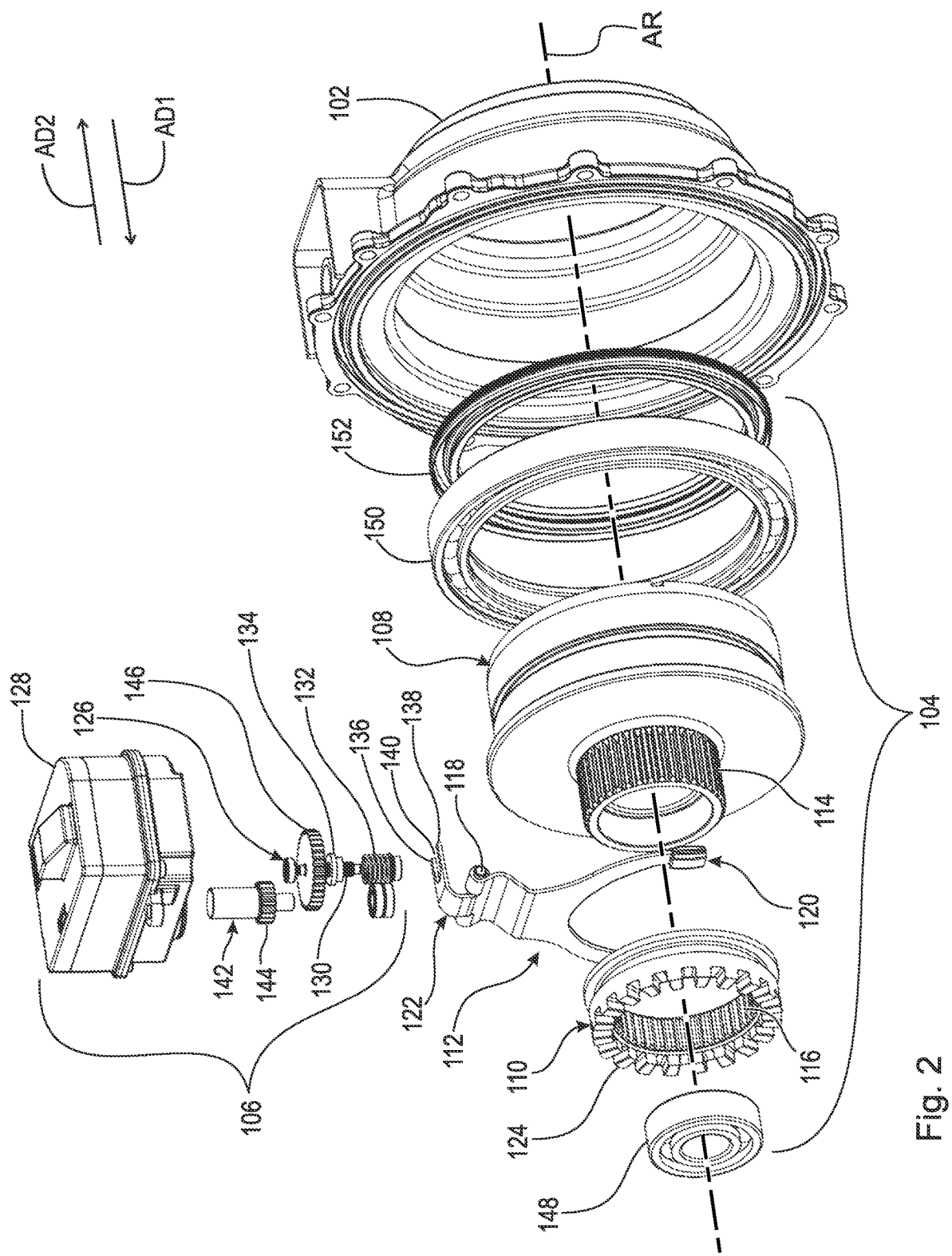
FIG. 2 is an exploded view of the axle disconnect assembly shown in FIG. 1.

FIG. 2 is an exploded view of axle disconnect assembly 100 shown in FIG. 1. The following should be viewed in light of FIGS. 1 and 2. Axle disconnect assembly 100 includes housing 102, clutch 104, and actuation assembly 106. Clutch 104 includes main shaft 108, sleeve 110, and shift lever 112. Main shaft 108 includes splines 114. Sleeve 110 includes splines 116 non-rotatably connected to splines 114. Shift lever 112 includes: at least one pivot pin 118 connected to housing 102; end 120 directly connected to sleeve 110; and end 122. In the example of FIG. 1, clutch 104 is a dog clutch. In the example of FIG. 1, at least one pivot pin 118 is a single pivot pin 118. In an example embodiment not shown, at least one pivot pin 118 is two pivot pins 118. Hereinafter, at least one pivot pin 118 is designated by "pivot pin 118." Pivot pin 118 can be any shape known in the art, including but not limited to cylindrical.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 3:
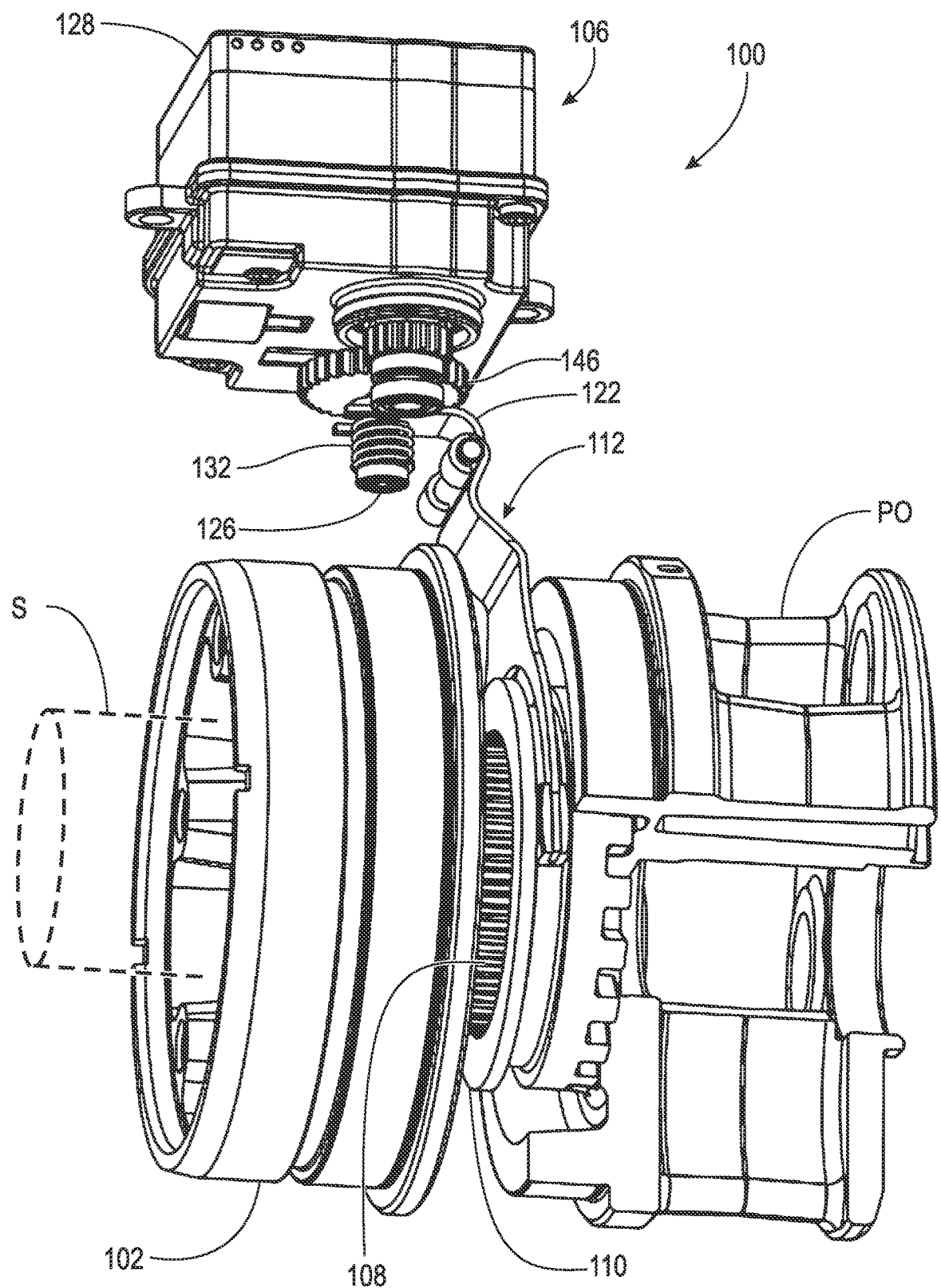
FIG. 3 is an isometric view of the axle disconnect assembly shown in FIG. 1, in a connect mode.

FIG. 3 is an isometric view of axle disconnect assembly 100 shown in FIG. 1, in a connect mode.

Figure 4:
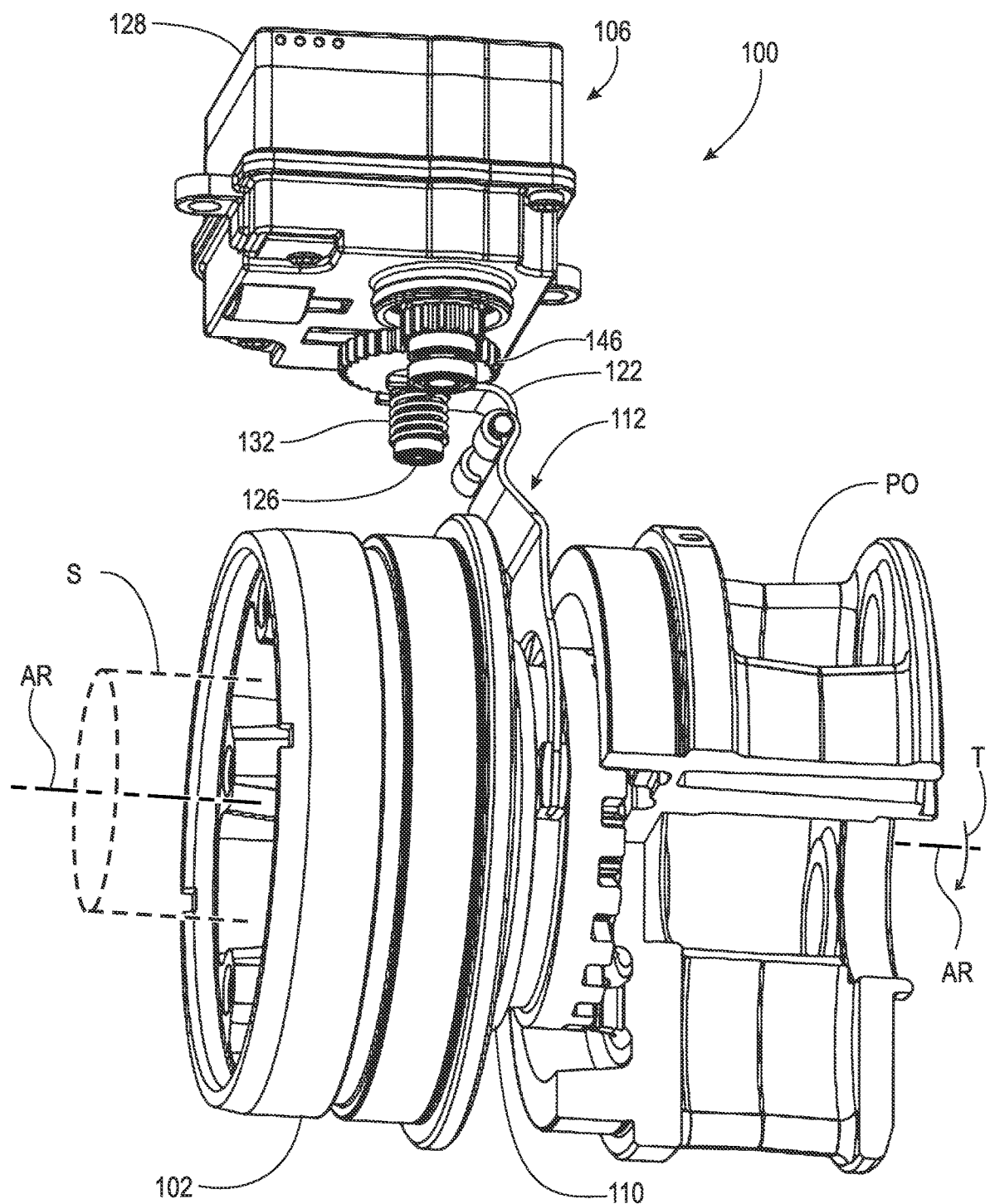
FIG. 4 is an isometric view of the axle disconnect assembly shown in FIG. 1, in a disconnect mode.

FIG. 4 is an isometric view of axle disconnect assembly 100 shown in FIG. 1, in a disconnect mode.

Figure 5:
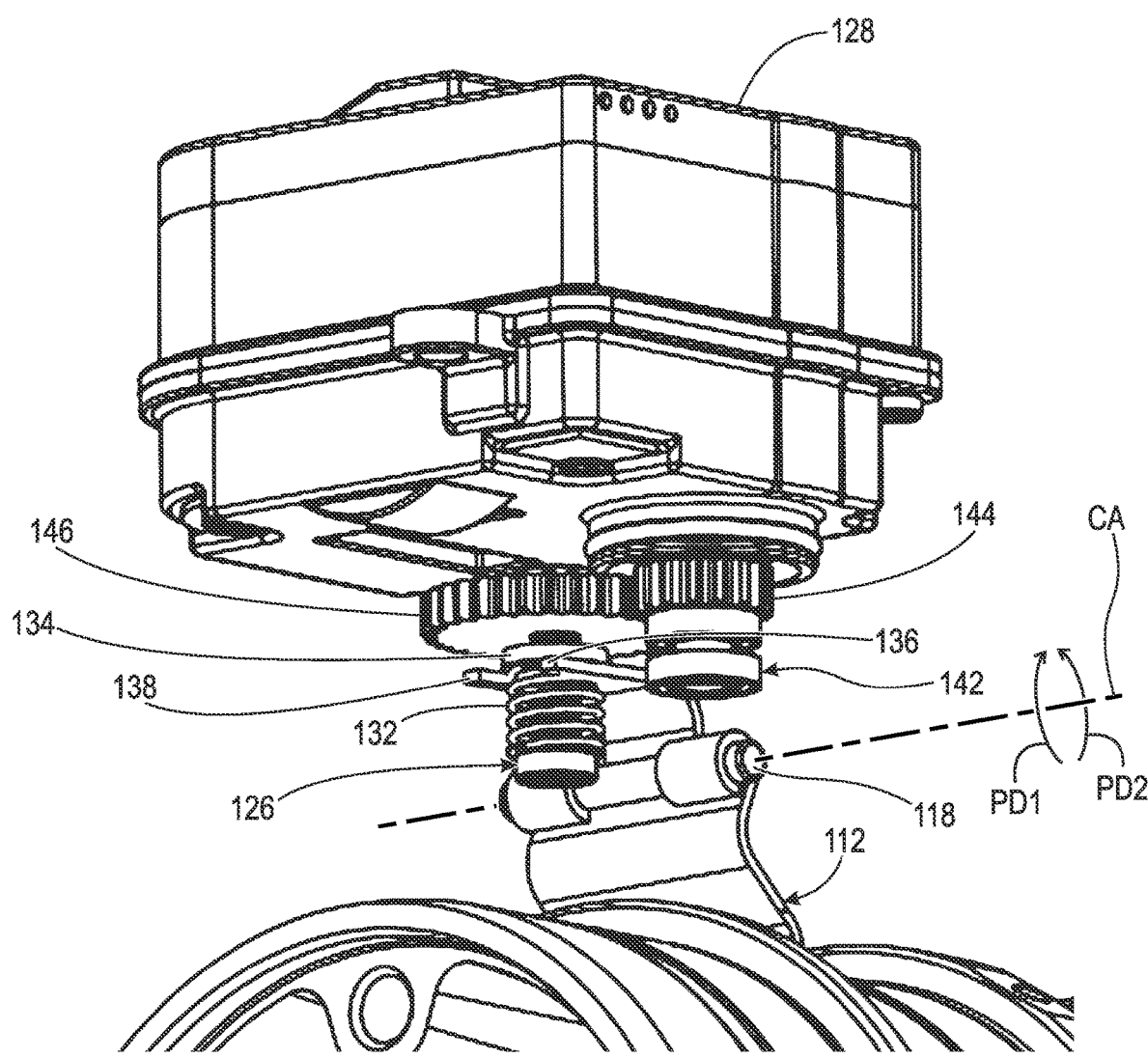
FIG. 5 is a detail of FIG. 3.

FIG. 5 is a detail of FIG. 3.

Figure 6:
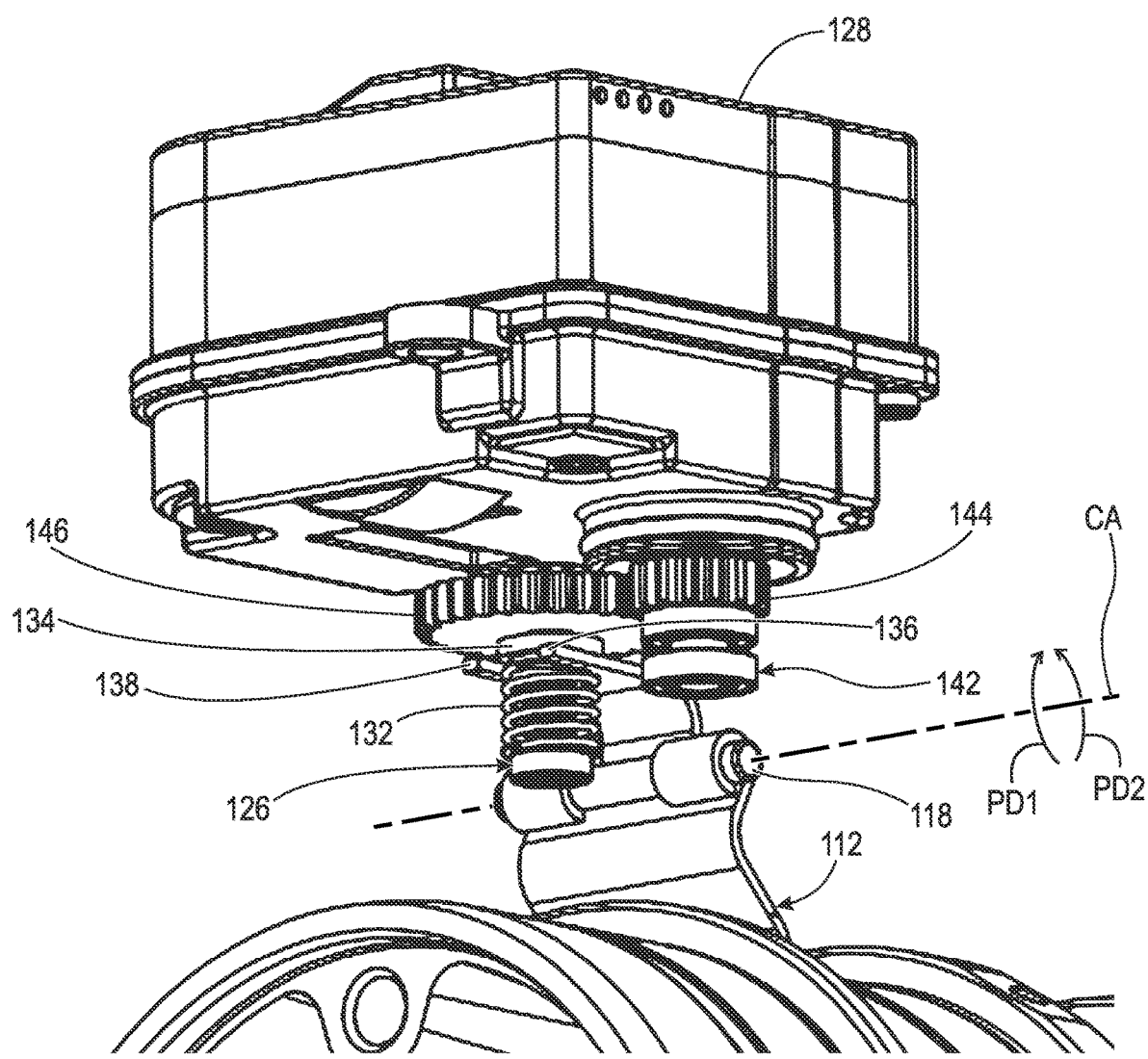
FIG. 6 is a detail of FIG. 4.

FIG. 6 is a detail of FIG. 4. The following should be viewed in light of FIGS. 1 through 6. Sleeve 110 includes teeth 124 extending in axial direction AD1, parallel to axis of rotation AR of clutch 104. Actuator assembly 106 includes actuator shaft 126 and actuator 128. In the connect mode: teeth 124 of sleeve 110 are arranged to non-rotatably connect to power output PO, for example for an electric motor (not shown); and clutch 104 is arranged to transmit torque T from power output PO to shaft S, for example for an axle. In a disconnect mode, sleeve is arranged to be disengaged from power output PO and rotatable with respect to power output PO.

Figure 7:
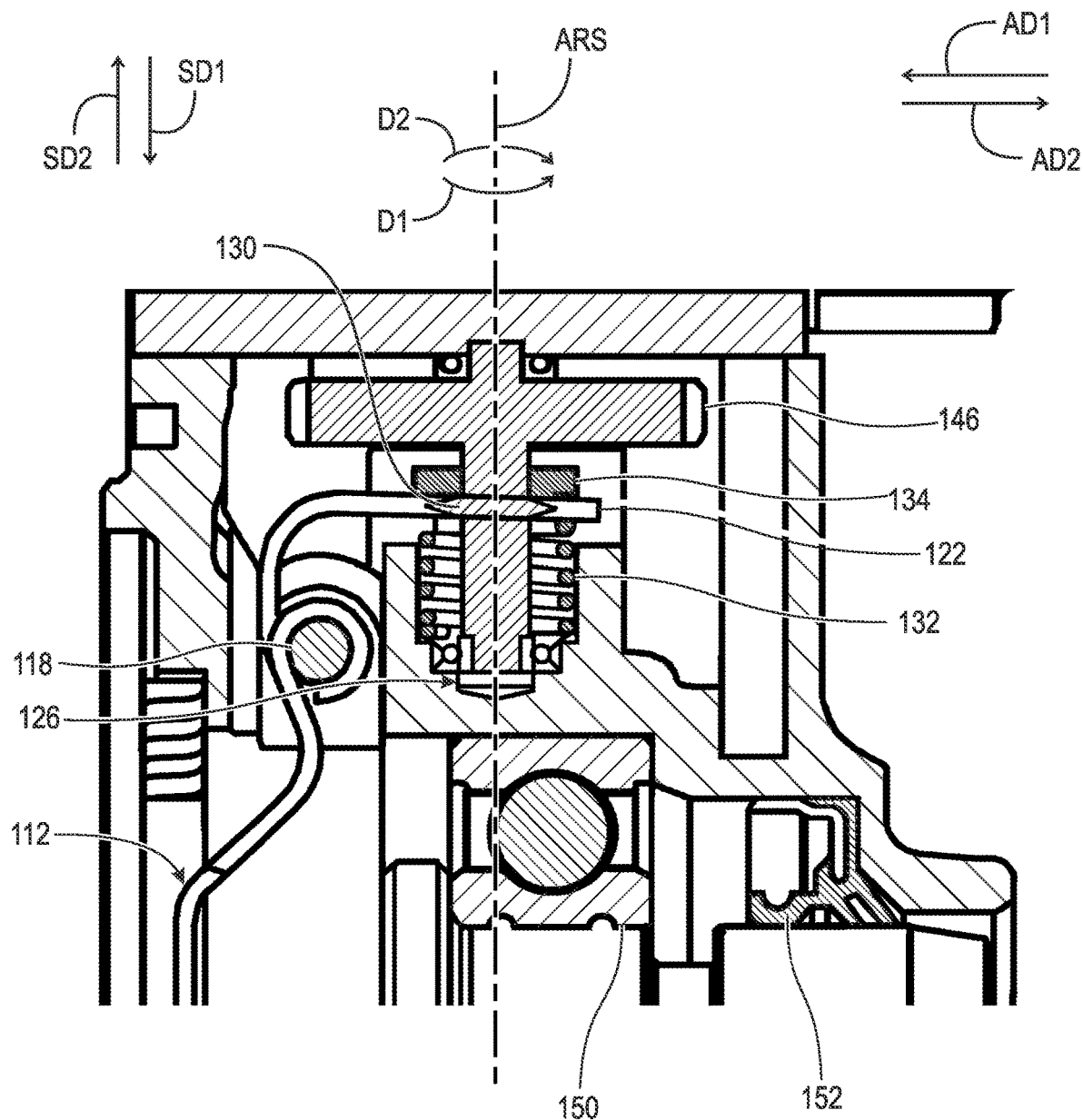
FIG. 7 is a cross-sectional view generally along line A-A in FIG. 1, with the axle disconnect assembly in the connect mode.

FIG. 7 is a cross-sectional view generally along line A-A in FIG. 1, with axle disconnect assembly 100 in the connect mode.

Figure 8:
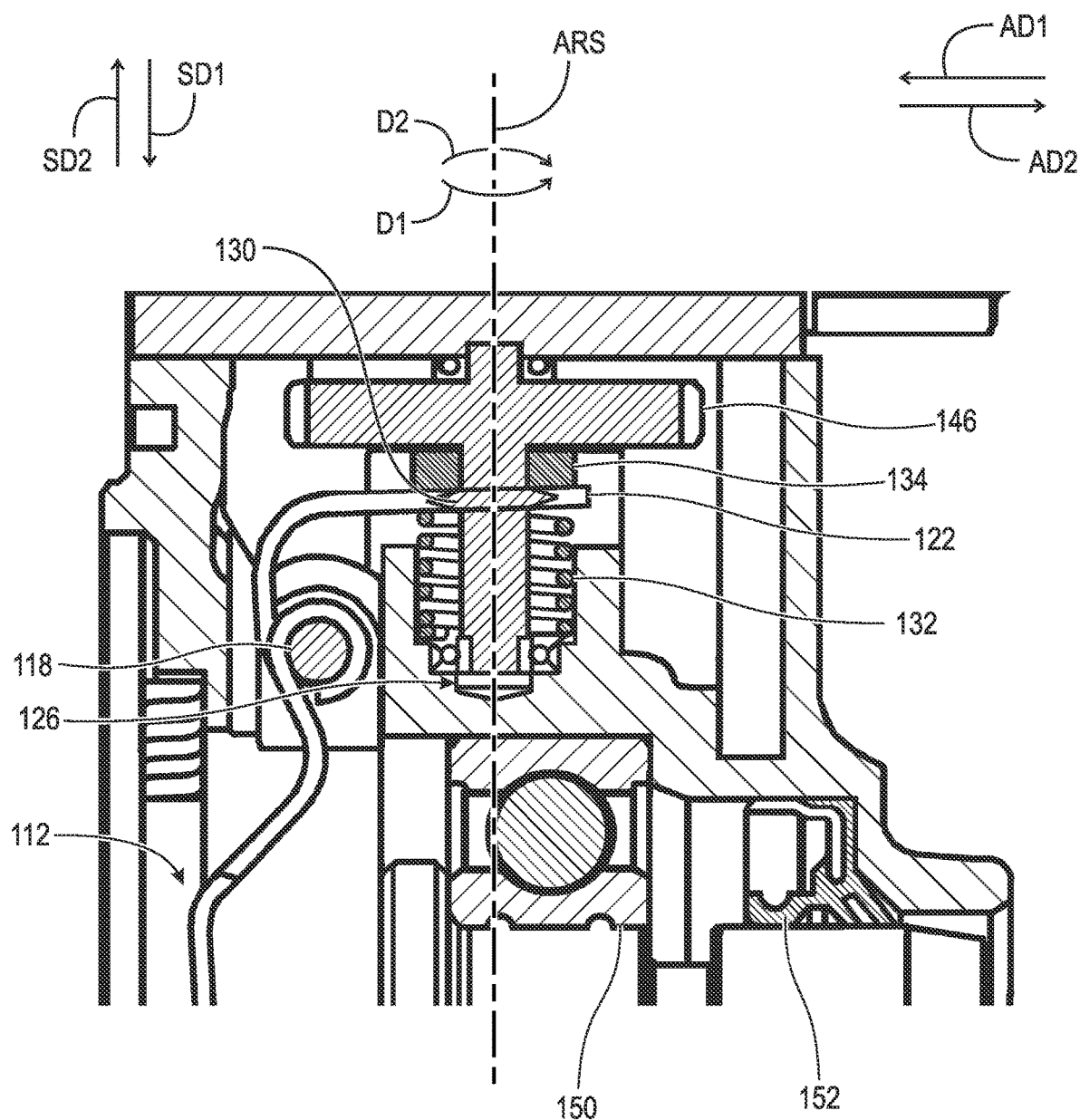
FIG. 8 is a cross-sectional view generally along line A-A in FIG. 1, with the axle disconnect assembly in the disconnect mode.

FIG. 8 is a cross-sectional view generally along line A-A in FIG. 1, with axle disconnect assembly 100 in the disconnect mode. The following should be viewed in light of FIGS. 1 through 8. Actuator shaft 126 includes threads 130; and actuation assembly 106 includes resilient element 132, and nut 134 meshed with threads 130. End 122 of shift lever 112 includes arm 136 extending at least partly in axial direction AD2 and arm 138 extending at least partly in direction AD2. Arms 136 and 138 define slot 140 through which actuator shaft 126 passes. Arms 136 and 138 are radially sandwiched between resilient element 132 and nut 134 in opposite shift directions SD1 and SD2 parallel to axis of rotation ARS of actuator shaft 126. Resilient element 132 is preloaded to urge end 122 of shift lever 112 at least partly in direction SD2. In the example of FIG. 1, actuator shaft 126 is non-displaceable, with respect to actuator 128, parallel to axis ARS.

To shift from the disconnect mode to the connect mode: actuator 128 is arranged to rotate actuator shaft 126 in direction D1 around axis of rotation ARS of actuator shaft 126; actuator shaft 126 is arranged to displace nut 134 in shift direction SD1; resilient element 132 is arranged to displace end 122 of shift lever 112 at least partly in shift direction SD1; shift lever 112 is arranged to pivot in pivot direction PD2 around central axis CA of pivot pin 118; and end 120 of shift lever 112 is arranged to displace sleeve 110, with respect to main shaft 108, in axial direction AD1 by sliding splines 116 along splines 114.

To shift from the connect mode to the disconnect mode: actuator 128 is arranged to rotate actuator shaft 126 in direction D2, opposite direction D1; actuator shaft 126 is arranged to displace nut 134 in direction SD2; nut 134 is arranged to displace end 122 of shift lever 112 at least partly in direction SD2; end 122 is arranged to compress resilient element 132 and to pivot shift lever 112 in pivot direction PD1, opposite direction PD2, around central axis CA of pin 118; and end 120 of shift lever 112 is arranged to displace sleeve 110, with respect to main shaft 108, in axial direction AD2, by sliding splines 116 along splines 114.

In the example of FIGS. 1 through 8: actuation assembly 106 includes actuator shaft 142 directly driven by actuator 128; actuator shaft 142 includes gear 144; and actuator shaft 126 includes gear 146 meshed with gear 144. Gears 144 and 146 provide torque and/or speed control between actuator 128 and actuator shaft 126.

In the example of FIG. 1, axle disconnect assembly 100 includes inner bearing 148, outer bearing 150, and seal 152.

Figure 9:
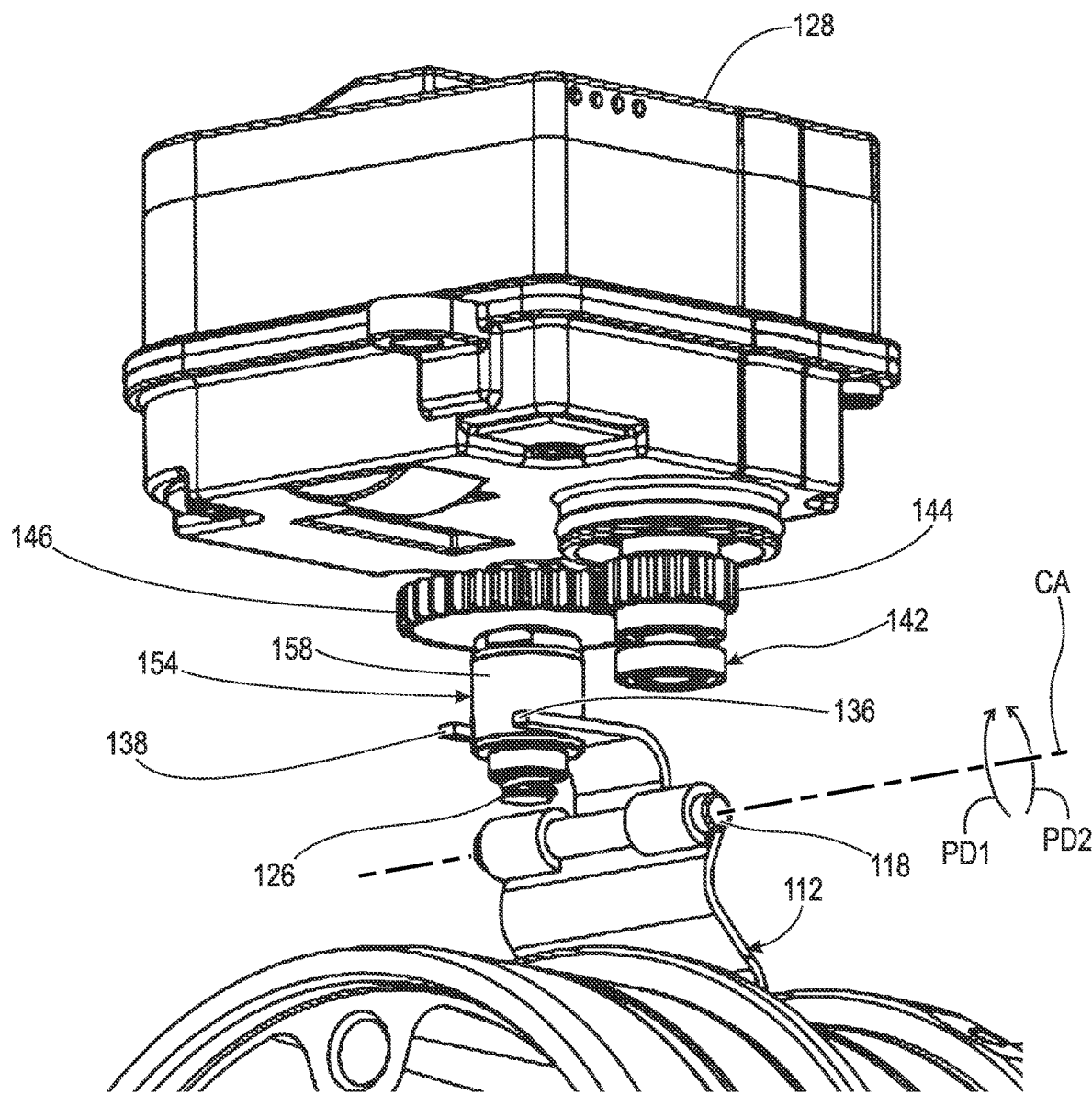
FIG. 9 is an isometric detail of the axle disconnect assembly shown in FIG. 1, with a ball screw in an actuation assembly, in the connect mode.

FIG. 9 is an isometric detail of axle disconnect assembly 100 shown in FIG. 1, with a ball screw in actuation assembly 106, in the connect mode.

Figure 10:
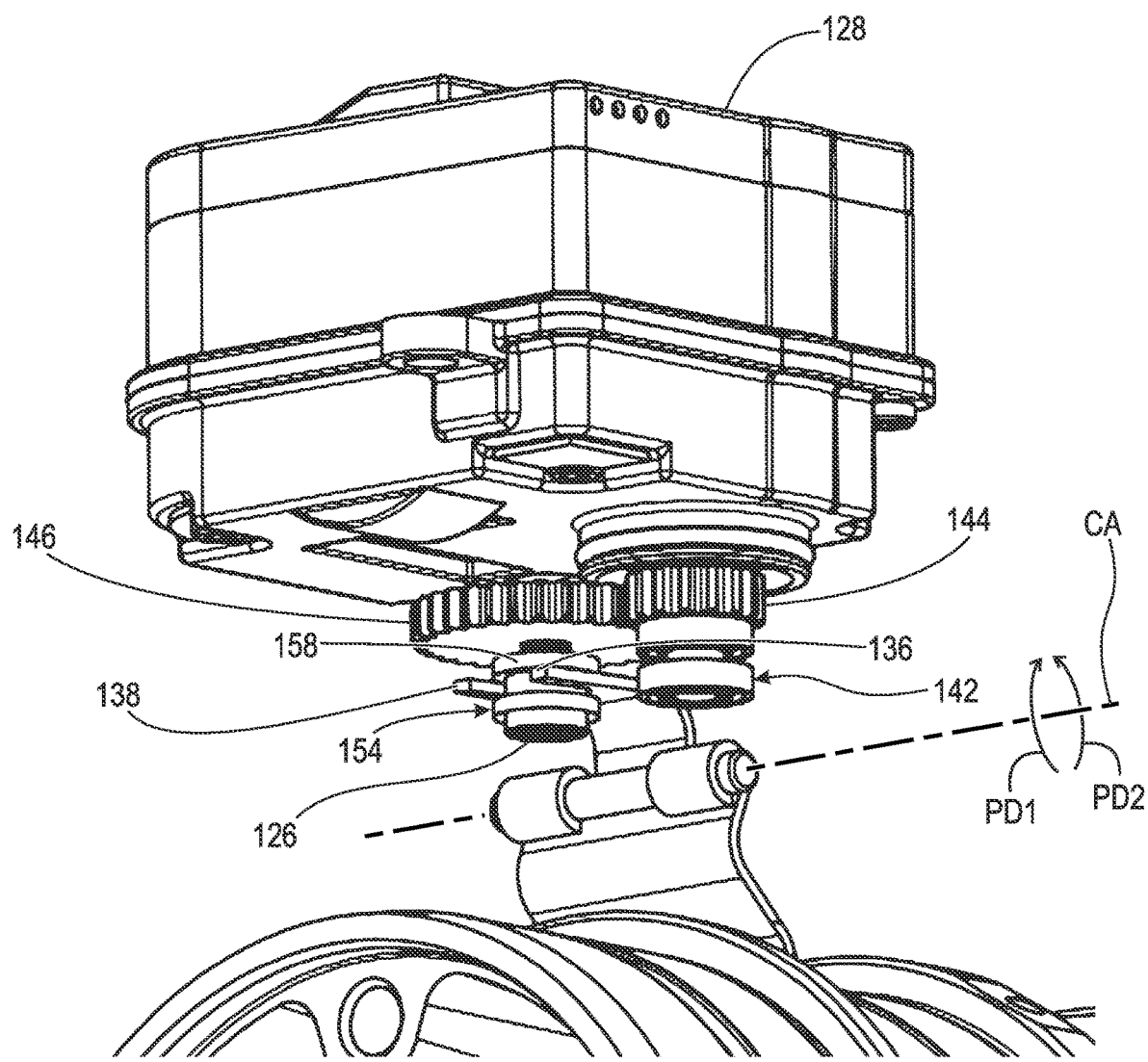
FIG. 10 is an isometric detail of the axle disconnect assembly shown in FIG. 9 in the disconnect mode.

FIG. 10 is an isometric detail of axle disconnect assembly 100 shown in FIG. 9 in the disconnect mode.

Figure 11:
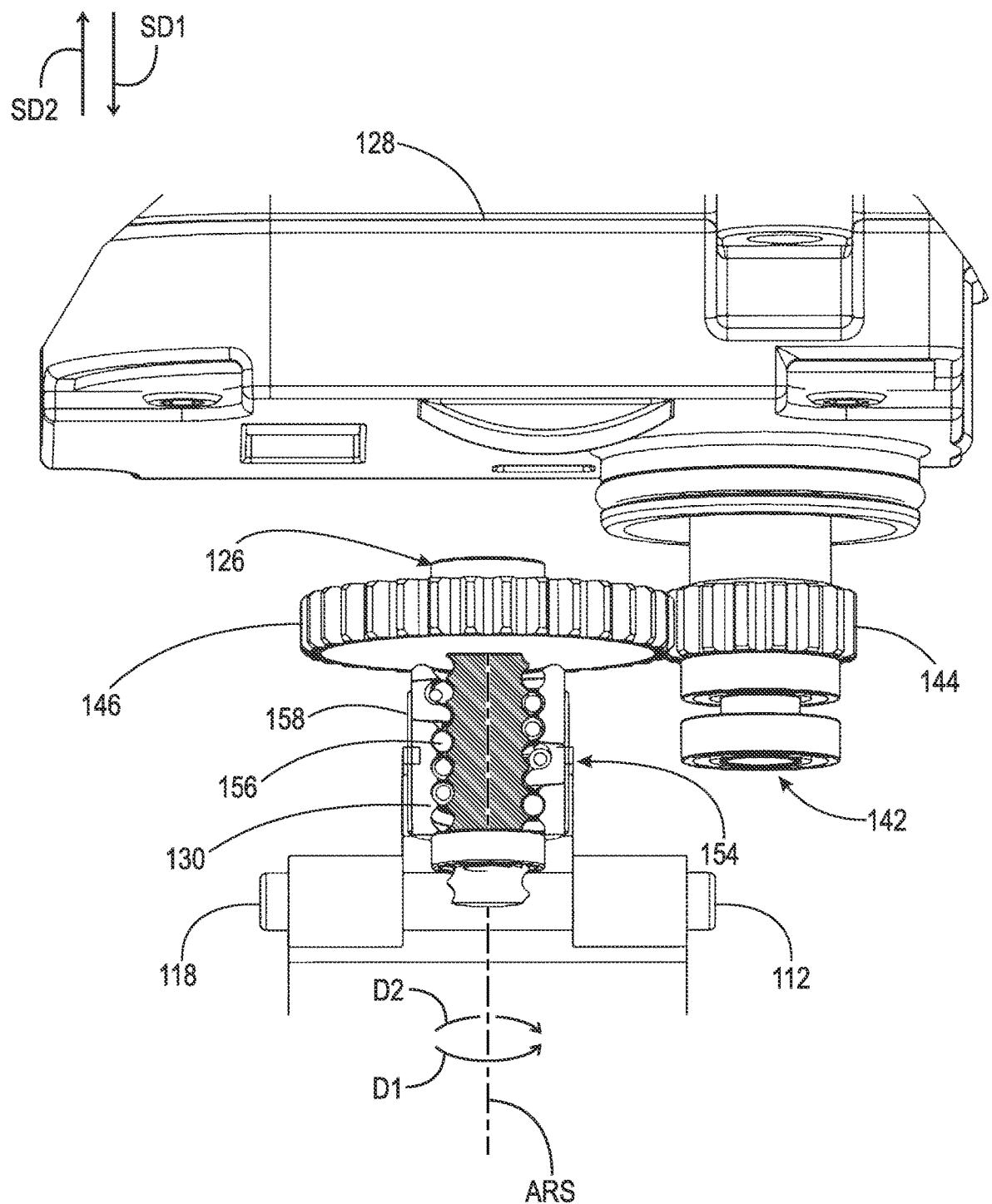
FIG. 11 is a view of the actuation assembly shown in FIG. 9 with a cross-section through the ball screw.

FIG. 11 is a view of the actuation assembly shown in FIG. 9 with a cross-section through the ball screw. Except as noted, the discussion for FIGS. 1 through 8 is applicable to FIGS. 9 through 11. In the example of FIGS. 9 through 11: actuation assembly includes ball screw 154; and ball screw 154 includes actuator shaft 126, balls 156, and ball screw nut 158. Ball screw 154 replaces resilient element 132 and nut 134. Ball screw 154 eliminated the need for resilient element 132.

To shift from the disconnect mode to the connect mode: actuator 128 is arranged to rotate actuator shaft 126 in direction D1 around axis of rotation ARS; actuator shaft 126 is arranged to displace ball screw nut 158 in shift direction SD1; ball screw nut 158 is arranged to displace end 122 of shift lever 112 at least partly in shift direction SD1; shift lever 112 is arranged to pivot in pivot direction PD2 around central axis CA of pin 118; and end 120 of shift lever 112 is arranged to displace sleeve 110, with respect to main shaft 108, in axial direction AD1 by sliding splines 116 along splines 114.

To shift from the connect mode to the disconnect mode: actuator 128 is arranged to rotate actuator shaft 126 in direction D2 around axis of rotation ARS; actuator shaft 126 is arranged to displace ball screw nut 158 in shift direction SD2; ball screw nut 158 is arranged to displace end 122 of shift lever 112 at least partly in shift direction SD2; shift lever 112 is arranged to pivot in pivot direction PD1 around central axis CA of pin 118; and end 120 of shift lever 112 is arranged to displace sleeve 110, with respect to main shaft 108, in axial direction AD2 by sliding splines 116 along splines 114.

The following should be viewed in light of FIGS. 1 through 8. The following describes a method of operating axle disconnect assembly 100. Although the method is presented as a sequence of steps for clarity, no order should be inferred from the sequence unless explicitly stated. A first step rotates, with actuator 128, actuator shaft 126 in direction D1. A second step displaces, with nut 134, end 122 of shift lever 112 at least partly in shift direction SD1. A third step pivots, with nut 134, shift lever 112 in pivot direction PD2. A fourth step displaces end 120 of shift lever 112 at least partly in axial direction AD1. A fifth step displaces, with end 120, sleeve 110 in axial direction AD1. A sixth step non-rotatably connects teeth 124 of sleeve 110 with power output PO. A seventh step transmits rotational torque T from power output PO to shaft S non-rotatably connected to main shaft 108.

An eighth step rotates, with actuator 128, actuator shaft 126 in direction D2. A ninth step displaces, with resilient element 132, end 122 of shift lever 112 at least partly in shift direction SD2. A tenth step pivots, with resilient element 132, shift lever 112 in pivot direction PD1. An eleventh step displaces end 120 of shift lever 112 at least partly in axial direction AD2. A twelfth step displaces, with end 120, sleeve 110 in axial direction AD2. A thirteenth step disengages teeth 124 of sleeve 110 with power output PO.

The following should be viewed in light of FIGS. 1 through 11. The following describes a method of operating axle disconnect assembly 100. Although the method is presented as a sequence of steps for clarity, no order should be inferred from the sequence unless explicitly stated. A first step rotates, with actuator 128, actuator shaft 126 in direction D1. A second step displaces, with nut 158, end 122 of shift lever 112 at least partly in shift direction SD1. A third step pivots, with nut 158, shift lever 112 in pivot direction PD2. A fourth step displaces end 120 of shift lever 112 at least partly in axial direction AD1. A fifth step displaces, with end 120, sleeve 110 in axial direction AD1. A sixth step non-rotatably connects teeth 124 of sleeve 110 with power output PO. A seventh step transmits rotational torque T from power output PO to shaft S non-rotatably connected to main shaft 108.

An eighth step rotates, with actuator 128, actuator shaft 126 in direction D2. A ninth step displaces, with nut 158, end 122 of shift lever 112 at least partly in shift direction SD2. A tenth step pivots, with nut 158, shift lever 112 in pivot direction PD1. An eleventh step displaces end 120 of shift lever 112 at least partly in axial direction AD2. A twelfth step displaces, with end 120, sleeve 110 in axial direction AD2. A thirteenth step disengages teeth 124 of sleeve 110 with power output PO.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation, dog clutch
CA central axis, pivot pin
ARS axis of rotation, actuation shaft
D1 direction
D2 direction
PD1 pivot direction
PD2 pivot direction
PO power output
S shaft
SD1 shift direction
SD2 shift direction
T torque
100 axle disconnect assembly
102 housing
104 dog clutch
106 actuation assembly
108 main shaft
110 sleeve
112 shift lever
114 spline, main shaft
116 spline, sleeve
118 pivot pin
120 end, shift lever
122 end, shift lever
124 tooth, sleeve
126 actuator shaft
128 actuator
130 thread, actuator shaft
132 resilient element
134 threaded element
136 arm, shift lever
138 arm, shift lever
140 slot
142 actuator shaft
144 gear
146 gear
148 inner bearing
150 outer bearing
152 seal
154 ball screw
156 balls
158 ball screw nut

The invention claimed is:

1. An axle disconnect assembly, comprising:
a housing; and,
a clutch enclosed at least partly by the housing and including:
a main shaft including a first plurality of splines;
a sleeve arranged to receive rotational torque and including:
a second plurality of splines non-rotatably connected to the first plurality of splines; and,
a plurality of teeth extending in an axial direction, parallel to an axis of rotation of the clutch;
a shift lever including:
at least one pivot pin connected to the housing;
a first end connected to the sleeve; and,
a second end; and,
an actuation assembly including:
a first actuator shaft directly engaged with the second end of the shift lever; and,
an actuator, wherein:
in a connect mode of the axle disconnect assembly, the plurality of teeth of the sleeve is arranged to non-rotatably connect to a power output;
in a disconnect mode of the axle disconnect assembly, the sleeve is arranged to be rotatable with respect to the power output; and,
to shift from the disconnect mode to the connect mode:
the actuator is arranged to rotate the first actuator shaft in a first direction around an axis of rotation of the first actuator shaft;
the first actuator shaft is arranged to pivot the shift lever in a first pivot direction around a central axis of the at least one pivot pin; and,
the first end of the shift lever is arranged to displace the sleeve, with respect to the main shaft, in a first axial direction, parallel to the axis of rotation of the clutch, and the axis of rotation of the first actuator shaft is non-parallel relative to the axis of rotation of the clutch.

2. The axle disconnect assembly of claim 1, wherein to shift from the connect mode to the disconnect mode:
the actuator is arranged to rotate the first actuator shaft in a second direction, opposite the first direction;
the first actuator shaft is arranged to pivot the shift lever in a second pivot direction, opposite the first pivot direction, around the central axis of the at least one pivot pin; and,
the first end of the shift lever is arranged to displace the sleeve, with respect to the main shaft, in a second axial direction opposite the first axial direction.

3. The axle disconnect assembly of claim 1, wherein the actuation assembly includes a resilient element wrapped around the first actuator shaft.

4. The axle disconnect assembly of claim 1, wherein the first actuator shaft is non-displaceable, with respect to the actuator, parallel to the axis of rotation of the first actuator shaft.

5. The axle disconnect assembly of claim 1, wherein:
the first actuator shaft includes a first plurality of threads;
the actuation assembly includes:
a nut meshed with the first plurality of threads; and,
a resilient element urging the nut in a first shift direction parallel to the axis of rotation of the first actuator shaft; and,
the second end of the shift lever is sandwiched between the nut and the resilient element.

6. The axle disconnect assembly of claim 5, wherein to shift from the disconnect mode to the connect mode:
the first actuator shaft is arranged to displace the nut in a second shift direction, opposite the first shift direction; and,
the nut is arranged to compress the resilient element.

7. The axle disconnect assembly of claim 5, wherein to shift from the connect mode to the disconnect mode:
the actuator is arranged to rotate the first actuator shaft in a second direction, opposite the first direction;
the first actuator shaft is arranged to displace the nut in the first shift direction;
the resilient element is arranged to displace the second end of the shift lever at least partly in the first shift direction;
the shift lever is arranged to pivot in a second pivot direction, opposite the first pivot direction, around the central axis of the at least one pivot pin; and,
the second end of the shift lever is arranged to displace the sleeve, with respect to the main shaft, in a second axial direction, opposite the first axial direction.

8. The axle disconnect assembly of claim 1, wherein:
the first actuator shaft includes a first gear;
the actuation assembly includes a second actuator shaft including a second gear meshed with the first gear; and,
the actuator is arranged to directly rotate the second actuator shaft.

9. The axle disconnect assembly of claim 1, wherein:
the actuation assembly includes a ball screw; and,
the ball screw includes the first actuator shaft.

10. The axle disconnect assembly of claim 1, wherein:
the shift lever includes a body portion in contact with the at least one pivot pin; and,
the second end of the shift lever includes:
a first arm extending at least partly in a second axial direction, opposite the first axial direction; and,
a second arm extending at least partly in the second axial direction; and, the first arm and the second arm define a slot through which the first actuator shaft passes.

11. The axle disconnect assembly of claim 10, wherein:
the first actuator shaft includes a plurality of threads;
the actuation assembly includes:
a nut meshed with the plurality of threads; and,
a resilient element urging the nut in a shift direction parallel to the axis of rotation of the first actuator shaft; and,
the first arm and the second arm of the second end of the shift lever are sandwiched between the nut and the resilient element.

12. An axle disconnect assembly, comprising:
a housing; and,
a clutch enclosed at least partly by the housing and including:
a main shaft including a first plurality of splines;
a sleeve arranged to receive rotational torque and including:
a second plurality of splines non-rotatably connected to the first plurality of splines; and,
a plurality of teeth extending in a first axial direction parallel to an axis of rotation of the clutch;
a shift lever including:
at least one pivot pin connected to the housing;
a first end connected to the sleeve; and,
a second end; and, an actuation assembly including:
  an actuator shaft directly engaged with the second end of the shift lever;
  a nut meshed with the actuator shaft; and,
  an actuator, wherein:
in a connect mode of the axle disconnect assembly, the plurality of teeth of the sleeve is arranged to non-rotatably connect to a power output;
in a disconnect mode of the axle disconnect assembly, the sleeve is arranged to be rotatable with respect to the power output; and,
to shift from the disconnect mode to the connect mode:
  the actuator is arranged to rotate the actuator shaft in a first direction around an axis of rotation of the actuator shaft, wherein the axis of rotation of the actuator shaft is perpendicular relative to the axis of rotation of the clutch;
  the actuator shaft is arranged to displace the nut in a first shift direction parallel to an axis of rotation of the actuation shaft;
  the nut is arranged to displace the second end of the shift lever in the first shift direction;
  the shift lever is arranged to pivot in a first pivot direction around a central axis of the at least one pivot pin; and,
  the shift lever is arranged to displace the sleeve, with respect to the main shaft, in the first axial direction.

13. The axle disconnect assembly of claim 12, wherein:
the actuation assembly includes a resilient element wrapped around the actuation shaft;
the second end of the shift lever is sandwiched between the resilient element and the nut; and,
the resilient element urges the second end of the shift lever in a second shift direction, opposite the first shift direction.

14. The axle disconnect assembly of claim 13, wherein to shift from the disconnect mode to the connect mode, the nut is arranged to compress the resilient element.

15. The axle disconnect assembly of claim 12, wherein:
the actuation assembly includes a resilient element wrapped around the actuation shaft and urging the nut in a second shift direction, opposite the first shift direction; and,
to shift from the connect mode to the disconnect mode:
  the actuator is arranged to rotate the actuator shaft in a second direction, opposite the first direction around the axis of rotation of the actuator shaft;
  the actuator shaft is arranged to displace the nut in the second shift direction;
  the resilient element is arranged to displace the second end of the shift lever in the second shift direction;
  the shift lever is arranged to pivot in a second pivot direction, opposite the first pivot direction, around the central axis of the at least one pivot pin; and,
  the shift lever is arranged to displace the sleeve, with respect to the main shaft, in a second axial direction, opposite the first axial direction.

16. The axle disconnect assembly of claim 12, wherein to shift from the connect mode to the disconnect mode:
the actuator is arranged to rotate the actuator shaft in a second direction, opposite the first direction around the axis of rotation of the actuator shaft;
the actuator shaft is arranged to displace the nut in a second shift direction, opposite the first shift direction;
the nut is arranged to displace the second end of the shift lever in the second shift direction;
the shift lever is arranged to pivot in a second pivot direction, opposite the first pivot direction, around the central axis of the at least one pivot pin; and,
the shift lever is arranged to displace the sleeve, with respect to the main shaft, in a second axial direction, opposite the first axial direction.

17. The axle disconnect assembly of claim 12, wherein a position of the actuator shaft is fixed with respect to:
displacement in the first shift direction; and,
displacement in a second shift direction, opposite the first shift direction.

18. A method of operating an axle disconnect assembly including a housing and a clutch at least partly enclosed by housing, the clutch including a main shaft, a sleeve non-rotatably connected to the main shaft, a shift lever including at least one pivot pin connected to the housing, and an actuation assembly including an actuator, an actuator shaft directly engaged with the shift lever, and a nut meshed with the actuator shaft, the method comprising:
rotating, with the actuator, the actuator shaft in a first direction around an axis of rotation of the actuator shaft;
displacing, with the actuator shaft, the nut in a first shift direction parallel to the axis of rotation of the actuator shaft;
displacing, with the nut, a first end of the shift lever at least partly in the first shift direction;
pivoting, with the nut, the shift lever in a first pivot direction around a central axis of the at least one pivot pin;
displacing a second end of the shift lever at least partly in a first axial direction parallel to an axis of rotation of the clutch, wherein the axis of rotation of the actuator shaft is non-parallel to the axis of rotation of the clutch;
displacing, with the second end of the shift lever, the sleeve in the first axial direction;
non-rotatably connecting a plurality of teeth of the sleeve with a power output; and,
transmitting a torque from the power output to a shaft non-rotatably connected to the main shaft.

19. The method of claim 18, further comprising:
rotating, with the actuator, the actuator shaft in a second direction, opposite the first direction;
displacing, with the actuator shaft, the nut in a second shift direction, opposite the first shift direction;
displacing, with a resilient element wrapped around the actuation shaft, the first end of the shift lever at least partly in the second shift direction;
pivoting, with the resilient element, the shift lever in a second pivot direction, opposite the first pivot direction;
displacing the second end of the shift lever at least partly in a second axial direction, opposite the first axial direction;
displacing, with the second end of the shift lever, the sleeve in the second axial direction; and,
disengaging the plurality of teeth of the sleeve from the power output.

20. The method of claim 18, further comprising:
rotating, with the actuator, the actuator shaft in a second direction, opposite the first direction;
displacing, with the actuator shaft, the nut in a second shift direction, opposite the first shift direction;
displacing, with the nut, the first end of the shift lever at least partly in the second shift direction;
pivoting, with the nut, the shift lever in a second pivot direction, opposite the first pivot direction;

displacing the second end of the shift lever at least partly in a second axial direction, opposite the first axial direction;

displacing, with the second end of the shift lever, the sleeve in the second axial direction; and, disengaging the plurality of teeth of the sleeve from the power output.

\* \* \* \* \*